Jan. 7, 1958
J. D. HAYES ET AL
2,818,776
OBJECTIVE LENS
Filed Jan. 16, 1956
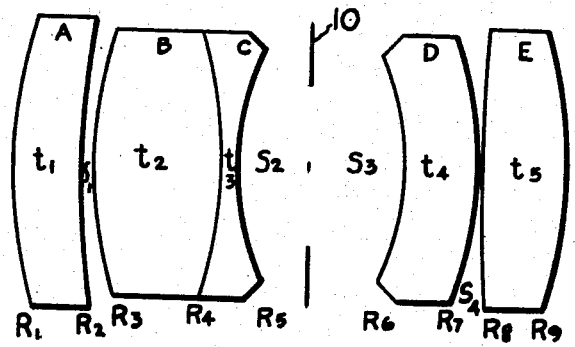
FIG. 1
| | E.F. = 100 | f/2.3 | F.A. = 56° | |
|---|---|---|---|---|
| LENS | RADII | t AND S | nD | ν |
| A | $R_1 = 46.80$<br>$R_2 = 136.38$ | $t_1 = 6.33$<br>$S_1 = 1.0$ | 1.670 | 47.2 |
| B | $R_3 = 41.76$<br>$R_4 = -226.0$ | $t_2 = 11.14$<br>$t_3 = 3.16$ | 1.657 | 50.9 |
| C | $R_5 = 24.95$ | $S_2 = 9.3$ | 1.668 | 32.3 |
| D | $R_6 = -25.27$<br>$R_7 = -35.89$ | $S_3 = 7.52$<br>$t_4 = 9.26$ | 1.649 | 33.8 |
| E | $R_8 = 985.84$<br>$R_9 = -52.05$ | $S_4 = .08$<br>$t_5 = 8.11$ | 1.620 | 60.3 |
FIG. 2
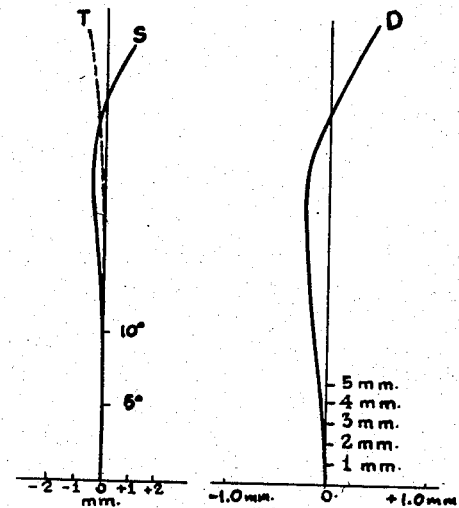
FIG. 3    FIG. 4
INVENTOR.
JOHN D. HAYES
AND
LENA M. HUDSON
BY
ATTORNEY

United States Patent Office 2,818,776
Patented Jan. 7, 1958

2,818,776

OBJECTIVE LENS

John D. Hayes, Rochester, and Lena M. Hudson, Brighton, N. Y., assignors to Bausch & Lomb Optical Company, Rochester, N. Y., a corporation of New York Application January 16, 1956, Serial No. 559,252

3 Claims. (Cl. 88—57)

This invention relates to photographic and similar objective lenses and more particularly it relates to improvements in objectives having four components, one of which may be a compound lens.

This type of objective lens is typically exemplified in the U. S. Patent 2,487,749, issued November 8, 1949, to C. G. Wynne, and in U. S. Patent 2,672,788, issued March 23, 1954, to T. Brendel which relate to objectives having wide field angles and high relative apertures. Both of the lenses described in the aforesaid patents comprise two negative meniscus components which are concave relative to an intervening diaphragm, said negative components being located between an outer pair of collective lenses and one of the negative components being of compound form.

As a result of recent research work on the aforementioned type of objective by the present inventors, it has been discovered that for best performance, the combined negative powers of the meniscus components and the combined powers of the collective lenses should each lie within certain established limits. Furthermore, the focal length and thickness of the second lens element are of special importance in providing a high degree of correction for the spherical aberration, coma, astigmatism and curvature of field. Further, the interface in the front negative compound lens must be properly formed in order to provide a high degree of chromatic correction.

It is an object of this invention to provide an improved objective lens of the aforementioned type which is well corrected for spherical and chromatic aberrations, coma, astigmatism and curvature of field throughout a wide lens angle and wherein reduction of the cost and complexity of manufacturing operations may be effected by the use of relatively flat lens curvatures, said objectives having a short overall length and a large relative aperture.

These and other objects and advantages will be apparent in the details of construction and in the form and arrangement of the parts of the objective by reference to the specification herebelow and the accompanying drawing in which:

Fig. 1 is a diagrammatic view of an optical objective incorporating our invention.

Fig. 2 is a table of constructional data relative to said objective.

Fig. 3 is a graph representing the residual tangential and sagittal astigmatism of the objective.

Fig. 4 is a graph representing the spherical aberration of said objective.

A photographic objective constructed according to our invention comprises four optically aligned components, the component nearest to the long conjugate side of the objective being a collective lens designated A, the second component being a negative meniscus compound lens composed of a front double convex element B cemented to a double concave element C and the entire component being airspaced from lens A. Spaced rearwardly thereof is a negative meniscus lens component D which together with the aforementioned compound lens enclose an intervening aperture stop or diaphragm 10, the meniscus lenses being concave thereto. The rear component is a positive or collective lens E spaced rearwardly from the lens D.

According to our invention, an objective having a wide field angle, and high relative aperture and improved image quality as shown in the graphs of Figs. 3 and 4 may be achieved with the use of lenses having relatively flat curvatures. In Fig. 3, the letter T indicates the amount of tangential astigmatism of our lens, the letter S indicates the amount of sagittal astigmatism, and the letter D of Fig. 4 indicates the amount of spherical aberration. An objective lens having these desirable image forming properties is achieved by making the constructional data conform with the conditions herebelow given. The combined positive power of the two outer collective lenses A and E should be between $+1.9P$ and $+2.4P$, where P represents the power of the entire objective, while the combined negative power of the two dispersive meniscus components BC and D should be between $-1.5P$ and $-2.1P$. The focal length of the B element of the front meniscus component should lie between 50% to 60% of the equivalent focal length of the objective, and its axial thickness $t_2$ should be 70% to 80% of the total thickness $t_2+t_3$ of the front meniscus component. The radius $R_4$ of the interface between the B and C lens elements should be 2.0 to 3.0 times the equivalent focal length of the objective and also should be 3.5 to 5.5 times the overall length of the objective. The interface radius $R_4$ is further specified as being greater than three times the sum of the outer radii $R_3+R_5$ and less than five times said sum as expressed in the mathematical expression, $$3(R_3+R_5)<R_4<5(R_3+R_5)$$

One condition which influences greatly the curvature of field is the thickness $t_4$ which should be between .14 to .20 times the overall length of the objective.

Constructional data for manufacturing one typical objective lens according to the above specified conditions is given herebelow wherein $R_1$ to $R_9$ inclusive represent the radii of the refractive lens surfaces numbered from the front to the rear, respectively, $t_1$ to $t_5$ inclusive represent the axial thicknesses of the respective lens elements starting with lens A, $S_1$ to $S_4$ represent the axial spacings of the lens elements from each other and their distances from the aperture stop 10, $n_D$ is the refractive index of the glass for the D line of the spectrum and $\nu$ is the Abbe number of the glass of the respective lens elements lettered A to E. E. F. is the equivalent focus for the D line of the spectrum.

E. F. = 100    f/2.3    F. A. = 56°

| Lens | Radii | t and S | $n_D$ | $\nu$ |
|---|---|---|---|---|
| A | $R_1=$ 46.80 | $t_1=$ 6.33 | 1.670 | 47.2 |
|   | $R_2=$ 136.38 | $S_1=$ 1.0 | | |
| B | $R_3=$ 41.76 | $t_2=$ 11.14 | 1.657 | 50.9 |
|   | $R_4=$ −226.0 | | | |
| C | | $t_3=$ 3.16 | 1.668 | 32.3 |
|   | $R_5=$ 24.95 | $S_2=$ 9.3 | | |
|   |   | $S_3=$ 7.52 | | |
|   | $R_6=$ − 25.27 | | | |
| D | $R_7=$ − 35.89 | $t_4=$ 9.26 | 1.649 | 33.8 |
|   | $R_8=$ 985.84 | $S_4=$ .08 | | |
| E | $R_9=$ − 52.05 | $t_5=$ 8.11 | 1.620 | 60.3 |

It will be apparent to those skilled in this art that other typical forms of photographic objectives may be constructed within the specifications and conditions set forth in the above description and changes and substitutions may be made therein without departing from the spirit of the invention as defined in the claims herebelow appended.

We claim:
1. A photographic objective or the like having a relative aperture at least as large as $f/2.3$ which is corrected for spherical and chromatic aberrations, coma, astigmatism and curvature of field comprising four air spaced lens components in optical alignment with each other, the two innermost of said components being of negative meniscus form, the concave sides thereof facing each other and facing a diaphragm located therebetween, the last-mentioned components being situated between two outer components of postive power, the component adjacent to the front side of said diaphragm being a compound lens having on its front side a double convex element which is cemented to a double concave element thus providing an interface therebetween which is convex toward said diaphragm, said interface having a radius of curvature that is 2.0 to 3.0 times longer than the equivalent focal length of said objective and is 3.5 to 5.5 times longer than the overall length of said objective, the component adjacent to the rear side of said diaphragm being a single lens, the combined negative power of the innermost components being between $-1.5P$ and $-2.1P$ where P represents the power of the entire objective and the combined positive power of the outermost components being between $+1.9P$ and $+2.4P$, and the axial thickness of the rearmost negative meniscus lens being between 14% and 20% of the overall length of said objective.

2. A photographic objective or the like having a relative aperture at least as large as $f/2.3$ which is corrected for spherical and chromatic aberrations, coma, astigmatism and curvature of field comprising four air spaced lens components in optical alignment with each other, the two innermost of said components being negative meniscus lenses having concave sides facing each other and having a diaphragm located between said sides, two positive components between which said negative meniscus lenses are situated, the negative component adjacent to the front side of said diaphragm being formed from a double convex front element which has a focal length between 50% and 60% of the equivalent focal length of the objective and is joined to a double concave element on its rear side forming an interface therebetween which has a negative radius of curvature $R_4$ that is related to the sum $R_3+R_5$ of the outer radii of curvature of the whole component according to the mathematical expression, $$3(R_3+R_5) < R_4 < 5(R_3+R_5)$$

the thickness $t_2$ of the double convex element being .7 to .9 of the total axial thickness of the compound component and the difference of refractive index between the convex and the concave elements being substantially .011, the radii $R_1$ to $R_9$ of the successive refractive surfaces of the lens elements numbering from the front being related to the equivalent focal length F of the objective according to the mathematical expression $$.40\ F < R_1 < .55\ F$$
$$1.2\ F < R_2 < 1.5\ F$$
$$.35\ F < R_3 < .45\ F$$
$$2.0\ F < R_4 < 3.0\ F$$
$$.22\ F < R_5 < .28\ F$$
$$.22\ F < R_6 < .28\ F$$
$$.33\ F < R_7 < .39\ F$$
$$6\ F < R_8 < \infty$$
$$.45\ F < R_9 < .6\ F$$

3. A photographic objective having a wide field angle and a relative aperture at least as large as $f/2.3$ which is corrected for spherical and chromatic aberrations, coma, astigmatism and curvature of field comprising a pair of concavo-convex dispersive lenses having their concave sides facing each other and facing an interposed aperture stop, a pair of collective lenses between which said dispersive lenses are positioned in air spaced and optically aligned relation, the foremost of said dispersive lenses being formed from a front double convex element which is cemented to a rear double concave element, one form of said objective being constructed according to the numerical data given herebelow wherein $R_1$ to $R_9$ are the radii of the refractive surfaces in their order of occurrence from front to rear, $t_1$ to $t_5$ are the thicknesses of the various lens elements A to E respectively, $S_1$ to $S_4$ are the separations of said elements A to E respectively, $n_D$ denotes the refractive indices for the D line of the spectrum and $\nu$ denotes the Abbe numbers of said elements.

Equivalent focal length=100
Relative aperture=$f/2.3$
Field angle=56°

| Lens | Radii | Thicknesses t and spaces S | $n_D$ | $\nu$ |
|---|---|---|---|---|
| A | $R_1=+\ 46.80$ | $t_1=\ 6.33$ | 1.670 | 47.2 |
|   | $R_2=+136.38$ | $S_1=1.0$ |  |  |
| B | $R_3=+\ 41.76$ | $t_2=11.14$ | 1.657 | 50.9 |
|   | $R_4=-226.0$ |  |  |  |
| C | $R_5=+\ 24.95$ | $t_3=\ 3.16$ | 1.668 | 32.3 |
|   |  | $S_2=\ 9.30$ |  |  |
|   |  | $S_3=\ 7.52$ |  |  |
| D | $R_6=-\ 25.27$ | $t_4=\ 9.26$ | 1.649 | 33.8 |
|   | $R_7=-\ 35.89$ | $S_4=\ .08$ |  |  |
| E | $R_8=+985.84$ | $t_5=\ 8.11$ | 1.620 | 60.3 |
|   | $R_9=-\ 52.05$ |  |  |  |

References Cited in the file of this patent

UNITED STATES PATENTS

| | | |
|---|---|---|
| 2,117,252 | Lee | May 10, 1938 |
| 2,171,640 | Berek | Sep. 5, 1939 |
| 2,391,209 | Warmisham | Dec. 18, 1945 |
| 2,487,749 | Wynne | Nov. 8, 1949 |
| 2,672,788 | Brendel | Mar. 23, 1954 |

FOREIGN PATENTS

| | | |
|---|---|---|
| 575,076 | Great Britain | Feb. 1, 1946 |